United States Patent [19]

Kuo

[11] Patent Number: 4,871,012

[45] Date of Patent: Oct. 3, 1989

[54] VARIABLE CONDUCTANCE THERMAL INSULATION BLANKET

[75] Inventor: Ying-Yan Kuo, Palo Alto, Calif.

[73] Assignee: Ford Aerospace Corporation, Newport Beach, Calif.

[21] Appl. No.: 179,804

[22] Filed: Apr. 11, 1988

[51] Int. Cl.$^4$ .......................... F28F 27/00; B64G 1/50
[52] U.S. Cl. ........................................ 165/41; 165/96; 165/904; 244/163
[58] Field of Search ...................... 165/41, 32, 96, 904; 244/163

[56]  References Cited

U.S. PATENT DOCUMENTS

| 3,167,159 | 1/1965 | Bovenkerk | 165/96 |
| 3,270,802 | 9/1966 | Lindberg | 165/96 |
| 3,749,156 | 7/1973 | Eby et al. | 165/96 |
| 3,823,305 | 7/1974 | Schroder | 165/96 |
| 3,950,947 | 4/1976 | Dirne et al. | 165/96 |
| 4,161,212 | 7/1979 | Hightower | 165/96 |

Primary Examiner—Albert W. Davis, Jr.
Attorney, Agent, or Firm—Edward J. Radlo; Keith L. Zerschling

[57]  ABSTRACT

A variable conductance thermal insulation blanket regulates the temperature of a component (20) on the surface (32) of a spacecraft. The blanket comprises a sealed container (2) and a pressurized gas tank (10). When gas is introduced from the tank (10) into the sealed container (20), heat is conducted away from the component (20) into outer space via conduction through the gas molecules. Thus, component (20) is cooled. When gas is evacuated from within sealed container (2) and there is a vacuum there-within, heat conduction is thwarted, and the primary means of heat escape from component (20) is via radiation. However, radiation is also thwarted by means of a set of stacked radiation sheilds (24) having low emissivity but high thermal conductivity.

2 Claims, 1 Drawing Sheet

VARIABLE CONDUCTANCE THERMAL INSULATION BLANKET

TECHNICAL FIELD

This invention pertains to the field of maintaining a constant temperature environment for components on-board spacecraft.

BACKGROUND ART

U.S. Pat. No. 4,161,212 discloses apparatus for cooling spacecraft components, comprising a cooling fluid which removes heat from the spacecraft components to be cooled. The fluid travels through a pipe and transfers the heat to a planar radiator. In transferring the heat from the pipe to the radiator, a pressurized gas is selectively incorporated into a concentric space surrounding the fluid within the pipe. This apparatus differs from the present invention in that: (1) there is no radiation shielding between the fluid and the outer periphery of the pipe or the radiator. This greatly reduces the range of heat transfer controllability, especially in the higher temperature range. (2) A cooling fluid is used. This adds weight, which is highly undesirable for the spacecraft application. (3) The use of the coolant fluid mandates the use of a pipe rather than an extended-area-surface blanket. Thus, the cooling means cannot be made to fit the contour of the equipment requiring variable heat transfer control.

U.S. Pat. No. 3,749,156 discloses a thermal control system for spacecraft using heat pipes and louvres rather than a blanket as in the present invention.

U.S. Pat. No. 3,950,947 discloses a heat transfer device making use of convection. Thus, it could not be used, as could the present invention, for three-axis controlled satellites, where gravity is not present. The present invention uses the principles of radiation and conduction rather than convection.

In the reference device, the greater the gas pressure, the less heat transfer through reservoir 15. This is the opposite effect produced by the present invention, in which increasing gas pressure within sealed container 2 increases the transfer of heat from heat source 20 to outer space. Furthermore, the reference device is very heavy because of the use of a working fluid and pump 23. Pump 23 is needed because gas cannot be vented to the external environment: doing so would cause the fluid to be lost.

DISCLOSURE OF THE INVENTION

The present invention is a variable conductance heat insulation blanket for regulating the temperature of a component (20) on the surface (32) of a spacecraft. The blanket comprises a sealed container (2) having an interior and an extended surface area. In other words, container (2) has first, second, and third dimensions with the first and second dimensions covering the component (20) and being substantially greater than the third dimension. Means (10,8,12) are present for selectively introducing a gas into the interior of the sealed container (2). Several layers of radiation shielding (24) are stacked within the interior of the sealed container (2). The radiation shields (24) have low emittance, high thermal conductivity, and extended surface areas along the first and second dimensions. When gas is not present within the sealed container (2), the blanket acts as a thermal insulator, keeping heat within the component (20). When gas is present within the sealed container (2), the blanket conducts heat away from the component (20) into outer space.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

On present day satellites and other spacecraft, there is often a good deal of apparatus such as component 20 that must be thermally controlled. Component 20 may be a piece of electronic equipment, such as a traveling wave amplifier, that generates heat. Or component 20 might be a battery pack. Component 20 usually periodically passes into and out of the path of the sun as the spacecraft travels on its mission. Component 20 may be turned on and off. Yet for its proper functioning, it is desirable for the temperature of component 20 to be maintained within a relatively narrow limit, such as between 20° C. and 40° C. What is needed is a means to keep component 20 from getting too cold at certain times during the spacecraft mission, and also to prevent component 20 from getting too hot at certain other times during the spacecraft mission. The present invention is a variable conductance heat insulation blanket which satisfies these needs.

Figure 1:
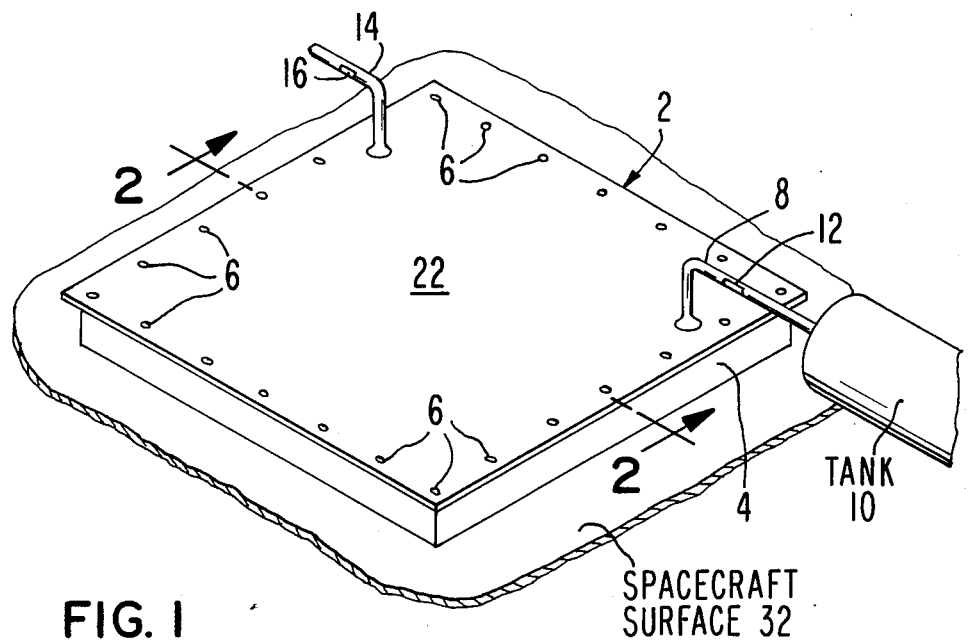
FIG. 1 is a perspective view of a typical configuration of the variable conductance thermal insulation blanket of the present invention.

As shown in FIG. 1, the blanket comprises a three-dimensional sealed container 2. Container 2 has an outer skin 22 with an extended surface area that is exposed to outer space. Disposed around the periphery of container 2 is a seal 4 which surrounds component 20 along the surface 32 of the spacecraft.

Container 2 has a generally planar shape, but it may be curved as desired to follow the contours of the spacecraft surface 32 and to cover component 20. Pressurized gas is stored in tank 10 and may be selectively introduced into the interior of container 2 via inlet port 8 and valve 12. The gas may be expelled from the interior of container 2 to the vacuum of outer space via outlet port 14 and valve 16. Bolts 6 are used to fasten skin 22 to perimeter seal 4, and to fasten seal 4 to surface 32.

Figure 2:
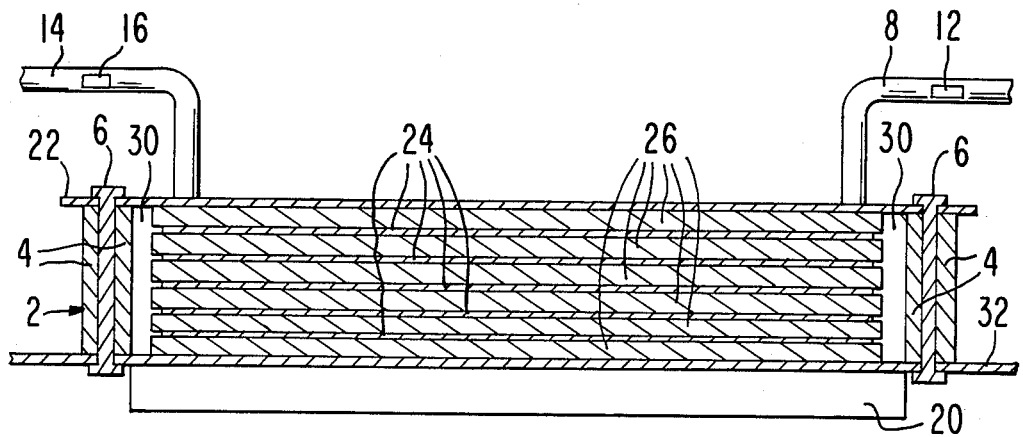
FIG. 2 is a side cross-sectional view, not to scale, of the blanket depicted in FIG. 1

As shown in FIG. 2, within the interior of container 2 are several stacked layers of radiation shielding 24. The radiation shields 24 have extended surface areas that are generally parallel to and slightly smaller than skin 22. The ends of shields 24 do not extend all the way to perimeter seal 4; rather, a space 30 is retained just within seal 4. This space allows the gas to fill the interior of container 2, including regions between shields 24. Interspersed between shields 24 are gas permeable spacing layers 26. Layers 26 prevent shields 24 from touching each other, which would impair their effectiveness as barriers to heat radiation. Layers 26 are made of a material, such as dacron webbing, which is a poor heat conductor. For low temperature applications, layers 26 are not needed; rather, alternating layers of radiation shields 24 may be crumpled to provide the required spacing.

When no gas is present within the interior of container 2 (i.e., the gas is replaced by a vacuum), the blanket acts to retain heat within component 20. Because layers 26 have poor thermal conductivity, the main avenue for heat loss from equipment 20 is via radiation. But radiation shields 24 inhibit this radiation. For this reason, shields 24 should have a low emittance so that little heat will be reradiated to the next (in the direction of outer space) shield 24 in the stack. Suitable materials for shields 24 are double-sided aluminized Kapton, polished aluminum, polished copper, and gold foil. The number of shields 24 is variable. The greater the number, the better the radiation shielding.

When gas is selectively introduced into the interior of container 2, it is desired for the blanket to conduct heat away from component 20 into outer space. The greater the gas pressure within container 2, the more molecules of gas are available for heat conduction; therefore, the more heat will be conducted away. For this reason, shields 24 should be made as thin as mechanically possible, because thick shields 24 would inhibit the conduction of heat during this mode of operation. A suitable thickness for shield 24 is 0.002".

Suitable gases are nitrogen and helium. Hydrogen is a better heat conductor, but is dangerous because explosive. Gas is typically introduced into container 2 at a maximum pressure of about 100 Torr (1/7 of an atmosphere). For a blanket having a round surface area with an 18" diameter and for this pressure of 100 Torr, a gas tank 10 having a diameter of about 6" and an initial internal pressure of 3,000 psi is adequate to provide heat control for a component 20 onboard a satellite having a 7-year lifetime, with one gas charge and one gas discharge cycle per day.

It is necessary that perimeter seal 4 be a good thermal insulator, have structural rigidity, and be able to withstand the designed pressure and heat loads. Suitable materials for seal 4 are plexiglass or ceramic or other organic materials.

Outer skin 22, unlike the case with radiation shields 24, should have a high emissivity. This maximizes its utility for the mode where gas is present within container 2 (heat is being removed from component 20). This mode drives the design of skin 22, rather than the mode where the blanket is acting as a thermal insulator, because the radiation shields 24 that are closer to component 20 are more important from a radiation shielding point of view than those remote from component 20, in view of the fact that radiation is cut by a factor of two by each shield 24. The surface of skin 22 can be made to have a high emissivity by means of painting it black. Skin 22 should be made as thin as mechanically feasible, to lower the heat loss via conduction through seal 4 when the blanket is acting as a thermal insulator. The thickness for skin 22 depends on the material used. A suitable material for skin 22 for relatively wide temperature applications (between 0° C. and 200° C.) is aluminum foil 0.06" thick. For extremely high temperature applications, e.g. up to about 500° C., a suitable material for skin 22 is stainless steel and a suitable material for seal 4 is a high temperature ceramic.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A variable conductance heat insulation blanket for regulating the temperature of a component on the surface of a spacecraft, comprising:
   a sealed container having an interior and first, second, and third dimensions, with the first and second dimensions covering the component and being substantially greater than the third dimension;
   means for selectively introducing a gas into the interior of the sealed container;
   several stacked layers of radiation shielding within the interior of the sealed container, said layers having low emittance, high thermal conductivity, and extended surface areas along the first and second dimensions;
   a perimeter seal defining the outer boundary of the sealed container along the first and second dimensions, said perimeter seal disposed on the surface of the spacecraft and surrounding the component;
   a thin outer skin defining the outer boundary of the sealed container along the third dimension, said outer skin covering the component from the point of view of outer space, being joined to the perimeter seal, having a first face facing the interior of the sealed container, and having a second face that is exposed to outer space and is coated with a coating having an emissivity substantially higher than that of the radiation shielding layers; and
   alternatingly interspersed between the layers of radiation shielding, several layers of gas permeable low thermal conductivity material for spacing the layers of radiation shielding apart from each other while inhibiting heat conduction from the component to outer space when gas is not present within the sealed container; wherein:
   the radiation shielding layers and associated layers of gas permeable low thermal conductivity material extend transversely along the first and second dimensions within the sealed container almost as far as the perimeter seal, so that a small amount of space is formed between ends of said radiation shielding layers and said associated layers of gas permeable low thermal conductivity material, on the one hand, and the perimeter seal within the interior of the sealed container, on the other hand, said space enabling the gas to diffuse between said radiation shielding layers more quickly than it would diffuse in the absence of said space; whereby:
   when gas is not present within the sealed container, the blanket acts as a thermal insulator keeping heat within the component; and
   when gas is present within the sealed container, the blanket conducts heat away from the component into outer space.

2. The blanket of claim 1 wherein the means for introducing gas comprises:
   a tank on board the spacecraft for storing the gas under pressure;
   a valved inlet port coupling the tank to the interior of the sealed container; and
   a valved outlet port coupling the interior of the sealed container to outer space.

* * * * *